US008952989B2

(12) United States Patent
Nonaka

(10) Patent No.: US 8,952,989 B2
(45) Date of Patent: Feb. 10, 2015

(54) VIEWER UNIT, SERVER UNIT, DISPLAY CONTROL METHOD, DIGITAL COMIC EDITING METHOD AND NON-TRANSITORY COMPUTER-READABLE MEDIUM

(71) Applicant: FUJIFILM Corporation, Tokyo (JP)

(72) Inventor: Shunichiro Nonaka, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 110 days.

(21) Appl. No.: 13/654,291

(22) Filed: Oct. 17, 2012

(65) Prior Publication Data

US 2013/0100166 A1    Apr. 25, 2013

(30) Foreign Application Priority Data

Oct. 21, 2011    (JP) .................................. 2011-232151

(51) Int. Cl.
| | | |
|---|---|---|
| G09G 5/00 | (2006.01) | |
| G06T 13/00 | (2011.01) | |
| G06T 11/60 | (2006.01) | |

(52) U.S. Cl.
CPC ............. *G06T 11/60* (2013.01); *G06T 2210/22* (2013.01)
USPC .......................................... 345/636; 345/473

(58) Field of Classification Search
CPC ............. G09G 5/00; G09G 5/34; G09G 5/32; G06F 3/048; G06F 3/00; A63F 13/00; G06T 11/60
USPC .................................................. 345/636, 473
See application file for complete search history.

(56) References Cited

FOREIGN PATENT DOCUMENTS

| | | | |
|---|---|---|---|
| JP | 2004-355235 A | | 12/2004 |
| JP | 2004355235 A | * | 12/2004 |
| JP | 2005-202062 A | | 7/2005 |
| JP | 2005202062 A | * | 7/2005 |
| JP | 2011039520 A | * | 2/2011 |

OTHER PUBLICATIONS

Chinese Office Action dated Oct. 11, 2014 with an English translation thereof.

* cited by examiner

*Primary Examiner* — Ryan R Yang
*Assistant Examiner* — Michael Le
(74) *Attorney, Agent, or Firm* — McGinn IP Law Group, PLLC

(57) ABSTRACT

A viewer unit, comprising a display control device configured to control to shift the position of the display range sequentially within the page image in accordance with the positional line determined by the determination device in order to display the images of each display range sequentially on the display device.

20 Claims, 14 Drawing Sheets

FIG.2

- PAGE INFORMATION

- FRAME INFORMATION
  (INCLUDING FRAME REGION INFORMATION)

- SPEECH BUBBLE INFORMATION
  (INCLUDING SPEECH BUBBLE REGION INFORMATION)

- TEXT REGION INFORMATION

- INTEREST REGION INFORMATION

- ASSOCIATION INFORMATION

FIG.13
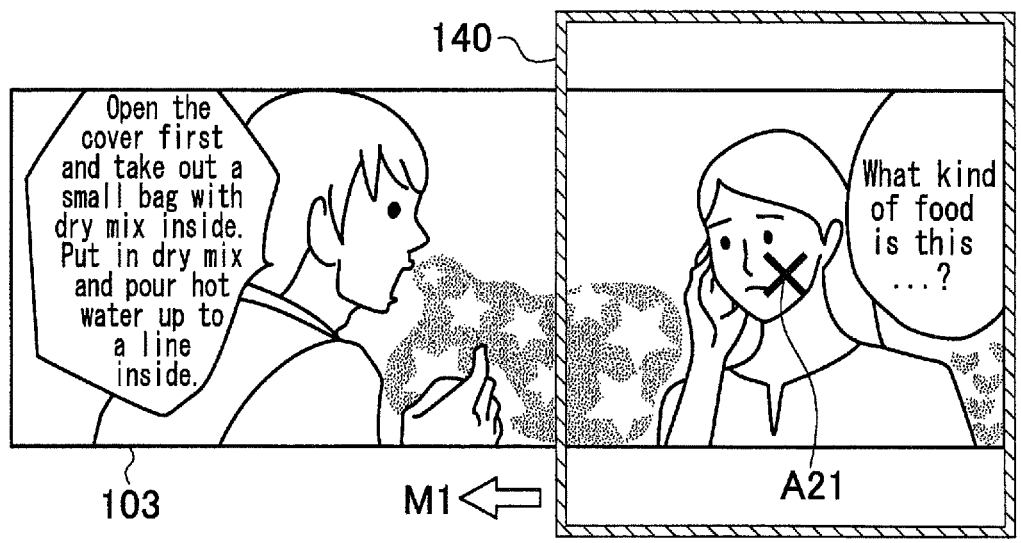
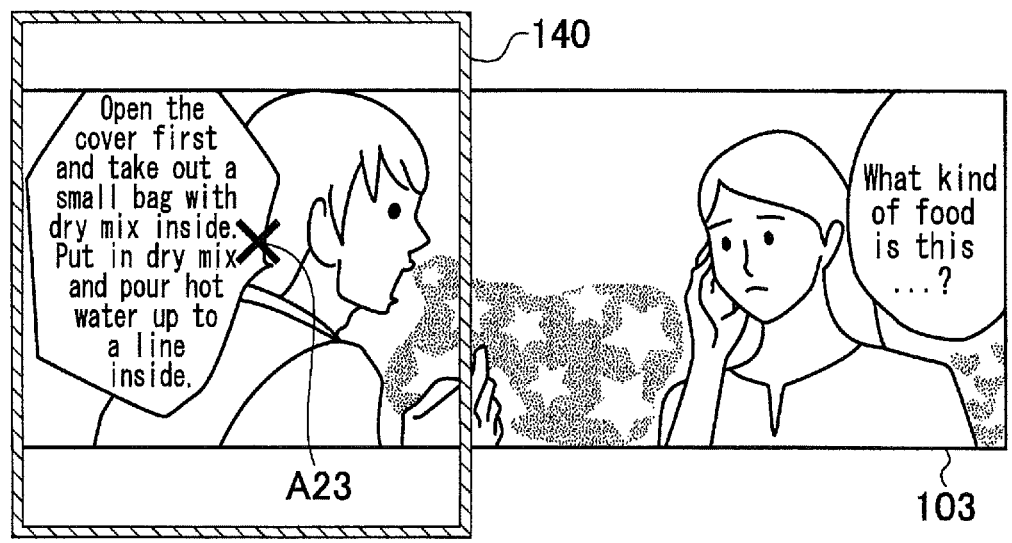

VIEWER UNIT, SERVER UNIT, DISPLAY CONTROL METHOD, DIGITAL COMIC EDITING METHOD AND NON-TRANSITORY COMPUTER-READABLE MEDIUM

BACKGROUND OF THE INVENTION

1. Field of the Invention

The present invention relates to a viewer unit, a server unit, a display control method, a digital comic editing method and a non-transitory computer-readable medium, and particularly relates to an art to display a digital comic.

2. Description of the Related Art

Recently, digital comics can be viewed even on a display unit which has a small size screen such as mobile phone.

Japanese Patent Application Laid-Open No. 2005-202062 discloses a display unit which is configured to determine whether a specified divided region of a comic (digital comic) image of a full page (for example, frame region) can be displayed on one screen. When it is determined that the entire region cannot be displayed on one screen, the display unit displays the entire specified region while dividing the region into multiple parts (i.e., multiple times on multiple screens). When displaying the specified region while dividing the region into multiple parts, there are two modes available; i.e., a mode in which the screen is fed in accordance with a screen feed operation made by a user, and a mode in which the screens are automatically fed at predetermined time intervals.

Japanese Patent Application Laid-Open No. 2004-355235 describes that plural frames may be positioned in a specific frame of a comic (digital comic).

However, generally, a character and speech thereof are arbitrarily disposed on an image of a digital comic. Also, the size of a display screen of the viewer unit on which the digital comic is displayed is not fixed. Therefore, when a comic image of one page is displayed being divided into multiple parts to align the image with the size of the display screen of the viewer unit, there is a problem such that the character and the speech may be displayed on multiple different screens being separated from each other.

That is, since a user cannot view a character and a speech made by the character at once on one screen, the impression of the original comic is reduced, and the pleasure of reading the comic is lost for the user.

The present invention has been proposed in view of the above circumstances. An object of the present invention is to provide a viewer unit, a server unit, a display control method, a digital comic editing method and a non-transitory computer-readable medium capable of providing users a pleasure given by viewing the comic by allowing the user to view a character appearing on the digital comic and a speech made by the characters at once even when the size of the display screen is different from each other depending on the model of the server unit.

SUMMARY OF THE INVENTION

In order to achieve the above object, the present invention provides a viewer unit, which includes: a data acquisition device configured to acquire a page image of each page of a comic and a piece of digital comic data which includes a piece of first region information representing a character region in which a character who appears in the comic is drawn within the page image, a piece of second region information representing a speech region in which a speech of the character is written and a piece of association information which associates the first region information with the second region information; a display device having a predetermined screen size; a determination device configured to determine a positional line of a display range corresponding to the screen size of the display device in order to shift the display device sequentially within the page image, the determination device configured to determine to include a position of the display range in the positional line in order to display a character and a speech made by the character at once on the display device based on the first region information and the second region information which are associated with each other by the association information; and a display control device configured to control to shift the position of the display range sequentially within the page image in accordance with the positional line determined by the determination device in order to display the images of each display range sequentially on the display device.

According to one embodiment of the present invention, the second region information representing the speech region is a piece of speech bubble region information representing a speech bubble region in which a speech bubble is drawn within the page image, the speech bubble region information is associated with the first region information representing the character region by the association information, the determination device determines whether both of the character region and the speech bubble region in which a speech of the character is written are positioned within the display range to thereby determine the position of the display range included in the positional line.

According to another embodiment of the present invention, the second region information representing the speech region is a piece of text region information representing a text region in which any one of texts within the page image is located, the text region information is associated with the first region information representing the character region by the association information, the determination device determines whether both of the character region and the text region in which a speech of the character is written are located within the display range to thereby determine the position of the display range included in the positional line.

Another embodiment of the present invention further includes shift instruction input device configured to receive an input of a shift instruction of the display range displayed on the display device, the display control device configured to control to shift the display range displayed on the display device within the page image every time when the shift instruction is input into the shift instruction input device.

According to another embodiment of the present invention, the character region is a region in which a face image of a character in the comic is drawn.

Also, the present invention provides a server unit for transmitting a page image of each page of a comic and a piece of digital comic data to a viewer unit having a predetermined screen size, the digital comic data including a piece of first region information representing a character region within the page image in which a character who appears in the comic is drawn, a piece of second region information representing a speech region in which a speech of the character is written and a piece of association information for associating the first region information with the second region information, the server unit, comprising: a data acquisition device configured to acquire the digital comic data; a determination device configured to determine a positional line of a display range corresponding to a screen size of the viewer unit for shifting the display device sequentially within the page image, the determination device configured to determine to include a position of the display range for displaying a character and a speech made by the character at once on the viewer unit in the positional line based on the first region information and the second region information which are associated with each other by the association information; and a device configured to write a piece of information representing the positional line determined by the determination device in the digital comic data.

The present invention provides a viewer unit which includes a reception device configured to receive digital comic data from the server unit; a display device having a predetermined screen size; a display control device configured to control to display the images of each display range sequentially on the display device while shifting the position of the display range sequentially within the page image in accordance with a piece of information representing the positional line within the digital comic data received by the reception device.

The present invention provides a viewer unit which includes a reception device configured to receive the digital comic data from the server unit; the display device having a predetermined screen size; a display control device configured to control to display the images of each display range sequentially on the display device while shifting the position of the display range sequentially within the page image in accordance with a positional disposition within the digital comic data received by the reception device.

Moreover, the present invention provides a display control method for displaying a digital comic on a display device having a predetermined screen size, the display control method comprising the steps of: acquiring a page image of each page of a comic and a piece of digital comic data which includes a piece of first region information representing a character region in which a character who appears in the comic is drawn within the page image, a piece of second region information representing a speech region in which a speech of the character is written, and a piece of association information which associates the first region information with the second region information; determining a positional line of a display range corresponding to the screen size of the display device in order to shift the display device sequentially within the page image, and determining to include a position of the display range in the positional line in order to display a character and a speech made by the character at once on the display device based on the first region information and the second region information which are associated with each other by the association information; controlling to shift the position of the display range sequentially within the page image in accordance with the positional line determined by the determining step in order to display the images of each display range sequentially on the display device.

Moreover, the present invention provides a digital comic editing method for editing a page image of each page of a comic and a piece of digital comic data which includes a piece of first region information representing a character region in which a character who appears in the comic is drawn within the page image, a piece of second region information representing a speech region in which a speech of the character is written, and a piece of association information which associates the first region information with the second region information; acquiring the digital comic data; determining a positional line of a display range corresponding to the screen size of a display device in order to shift the display device sequentially within the page image, and determining to include a position of the display range in the positional line in order to display a character and a speech made by the character at once on the display device based on the first region information and the second region information which are associated with each other by the association information; and writing a piece of information representing the positional line determined by the determining step in the digital comic data.

Moreover, the present invention provides a non-transitory computer-readable medium storing a program for causing a computer unit to execute the display control method.

Moreover, the present invention provides a non-transitory computer-readable medium storing a program for causing a computer unit to execute the digital comic editing method.

According to the present invention, a user can observe a character who appears on a digital comic and a speech made by the characters at once on a display screen even when the size of the display screen is different from each other depending on the model of the viewer unit; and thus, the user can enjoy viewing the comic.

BRIEF DESCRIPTION OF THE DRAWINGS

FIG. 2 illustrates an example of an information file;

FIG. 13 illustrates another display example in the second embodiment of the display control.

DETAILED DESCRIPTION OF THE PREFERRED EMBODIMENTS

Referring to the appended drawings, embodiments of the present invention will be described in detail bellow.

Figure 1:
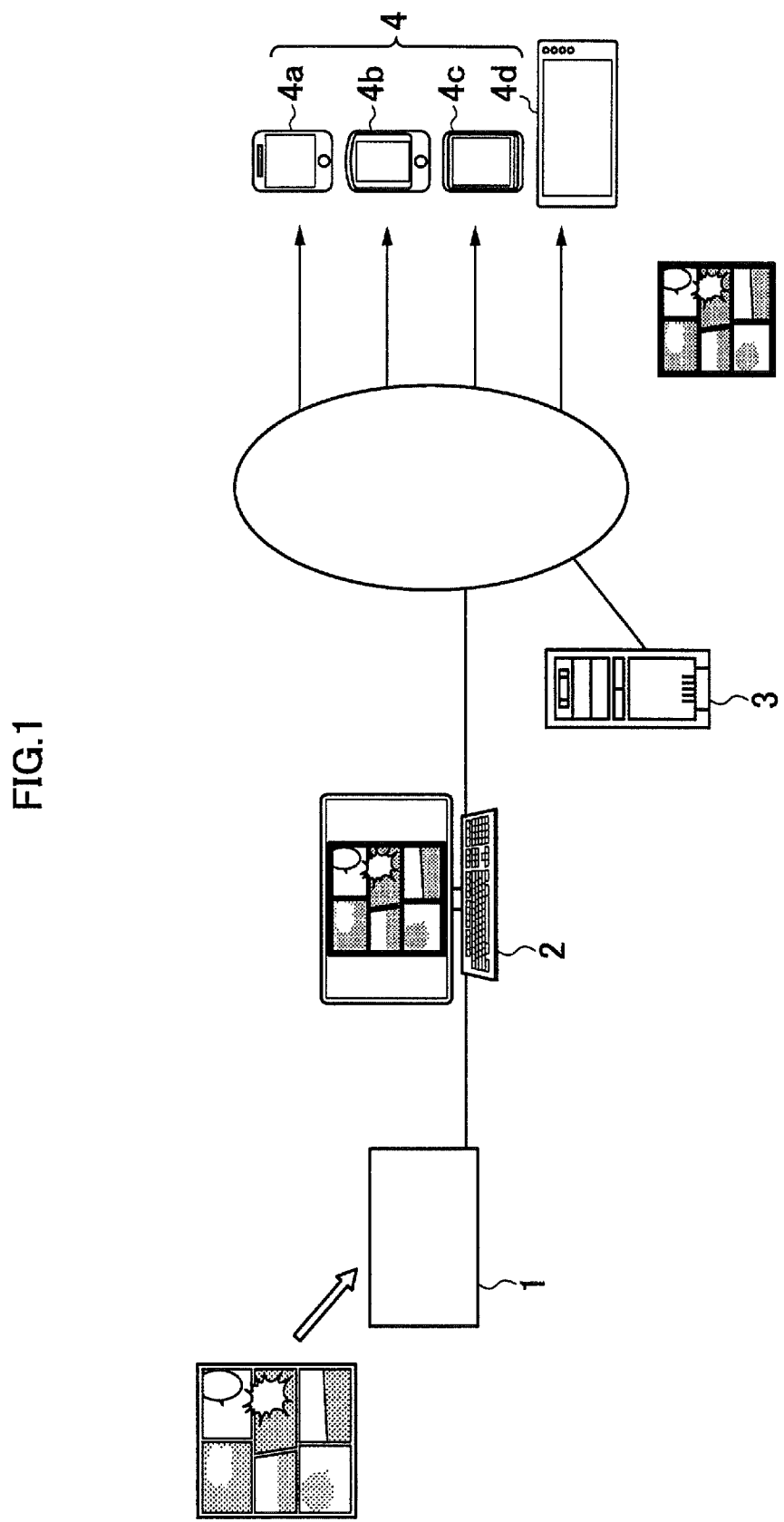
FIG. 1 illustrates an example of the entire configuration of a digital book browsing system.

FIG. 1 illustrates the entire configuration of an example of a digital book browsing system.

A scanner 1 reads an original of a comic (manga) on a sheet of paper to generate an image file which includes an image of each page of the comic (hereinafter, referred to as page image). FIG. 1 illustrates an example in which the image file is acquired by reading an original comic on a sheet of paper as an original which is scanned by the scanner 1, but the present invention is not limited to the above. The image file may be acquired by inputting a comic original which is electronically generated (digital original) via a network or a recording medium.

A digital comic editing unit 2 is an apparatus that edits a piece of digital comic data which includes the image file input through the scanner 1 or the like to generate a piece of master data of a digital comic. The digital comic editing unit 2 is constituted of, for example, a computer unit.

A server unit 3 converts the master data of the digital comic edited by the digital comic editing unit 2 into a piece of digital comic data of a format corresponding to each of viewer units 4 (4a-4d) as appropriate, and transmits the digital comic data to the viewer unit 4 via a network at the delivery request from the viewer unit 4. The server unit 3 is constituted of, for example, a computer unit.

The digital book viewer unit 4 receives the digital comic data transmitted from the server unit 3, and displays the page image (or frame image). The viewer unit 4 may be a various type of mobile terminal such as a mobile phone, a tablet terminal or a various type of terminal unit (computer unit) such a personal computer.

The display screen size of the digital book viewer unit 4 varies depending on the model thereof. When the display screen size of the digital book viewer unit 4 is smaller than the entire display size of the page image of each page of the digital comic data, the display is performed while shifting sequentially the display ranges corresponding to the display screen size of the digital book viewer unit 4 within the page image of the page. To display the images sequentially on the display screen of the viewer unit 4 while shifting the display ranges corresponding to display screen size within the page image may be hereinafter referred to as "sequential reproduction" or "screen-feed reproduction".

The digital comic data transmitted from the server unit 3 to the digital book viewer unit 4 is constituted of an image file including page image and an information file (collateral information).

The page image is a high resolution image (for example 3000×5000 pixels or 1500×2000 pixels) for each page.

The information file is a piece of information corresponding to all pages (or each page) of the comic. For example, the information file is written with a markup language such as XML file.

FIG. 2 shows an example of the information file.

The information file according to the embodiment includes a piece of page information which is the information relevant to a page, a piece of frame information which is the information relevant to a frame, a piece of speech bubble information which is the information relevant to a speech bubble, a piece of text region information which is the information relevant to a text region, a piece of interest region information which is the information relevant to interest region, and a piece of association information representing association among these pieces of information.

The page information includes a piece of information relevant to a page, a page name and a page ID. The information relevant to a page includes a piece of information on the content image which is provided on one-page open or two-page open, size of the original content and the like. The page information of the embodiment includes a piece of information relevant to the digital comic (title ID, title name, author, publisher (publication right holder), publication year, language and the like).

The frame information includes a piece of frame region information. The frame region information represents a region of the frames within the page image (frame region). The frame region information of the embodiment includes coordinates of vertexes of each frame and shape of each frame. The frame region information may be a piece of vector data representing a frame boundary or a piece of mask data representing frame region. The frame information includes number of frames included in the page image and a piece of frame sequence information representing reproduction sequence of the frames within the page image. As for the reproduction sequence of the frames, a appropriate pattern is selected from some transition patterns of frame sequence such as from the upper-right toward the lower-left, from the upper-left toward lower-right, and a shift direction (horizontal direction or vertical direction) in the page based on, for example, a piece of information relevant to right-open/left-open page, a piece of information relevant to content representing language used, frame allotment detected from the frame region information and the like. The reproduction sequence of the frames is automatically determined in accordance with the selected transition pattern.

The speech bubble information includes a piece of speech bubble region information. As for the speech bubble region information, for example, a piece of vector data representing an external edge of the speech bubble region and a piece of mask data (bitmap information) representing the speech bubble region are possible. The speech bubble region information is a piece of information representing a speech bubble region in a page image (or in a frame). The speech bubble region information may include a shape of the speech bubble, a start point (vertex on the speech bubble) and a direction of the speech bubble and a size of the speech bubble. The speech bubble region information may be represented with a specific point (center point) of the speech bubble and a size of the speech bubble. The speech bubble information may further include a piece of information of text included in the speech bubble, attributes of a line of the speech bubble (dotted line, solid line etc), a piece of identification information of a speaker in the speech bubble, a frame included in the speech bubble.

The text information includes a piece of text region information and a piece of information on the content of the text. As for the text region information, for example, a piece of coordinate data (coordinate data representing vertexes on the external edge of a polygonal shape) at plural points corresponding to the text region on a line, a piece of vector data representing the external edge of the text region, a piece of mask data representing a text region (range) (for example, bitmap information) are possible. The information on the content of the text includes a piece of information on text character attributes detected by an OCR, number of lines, line spacing, character proportional spacing, a method to switch the display, the language used, vertical/horizontal writing, a reading direction and the like. The character attribute information includes a character size (point number etc), a character type (font, highlighted character etc). The text information includes a speech of a speaker in the speech bubble. The text information may also include a translated sentence and of various languages corresponding to the original speech disposed in the speech bubble, and the language used (sentences translated into two or more languages).

As for the interest region information, a piece of coordinate data representing vertexes (vertexes of the external edge of the polygonal shape) of a region of interest (referred to as "ROI"), a piece of vector data representing the external edge of the ROI, a piece of mask data (for example, bitmap data) representing the ROI and the like are possible. The interest region information may include a piece of data representing a shape of the ROI. The interest region information may further include a piece of information on the characters included in the ROI (for example, automatically added character ID). Moreover, the interest region information may include the priority, degree of importance at display, identification information of the characters (name etc), attributes of the characters (sex, age etc). The interest region information according to this embodiment represents a region where the characters appear in the comic.

The association information is a piece of information representing association among the pieces of region information in the page image. In other words, the association information represents association among different kinds of regions. As for association information, association between the text region information and the interest region information, association between the speech bubble region information and the interest region information, association between the text region information and the speech bubble region information, association between the text region information and the frame information, association between the speech bubble region information and the frame information, association between the interest region information and the frame information and the like are possible.

In the following description, a first embodiment in which a transition line of a position (anchor position) of the display ranges in the page image is determined by the digital book viewer unit 4; and a second embodiment in which a transition line of a position (anchor position) of the display ranges in the page image is determined by the server unit 3 will be described in detail.

First Embodiment

Figure 3:
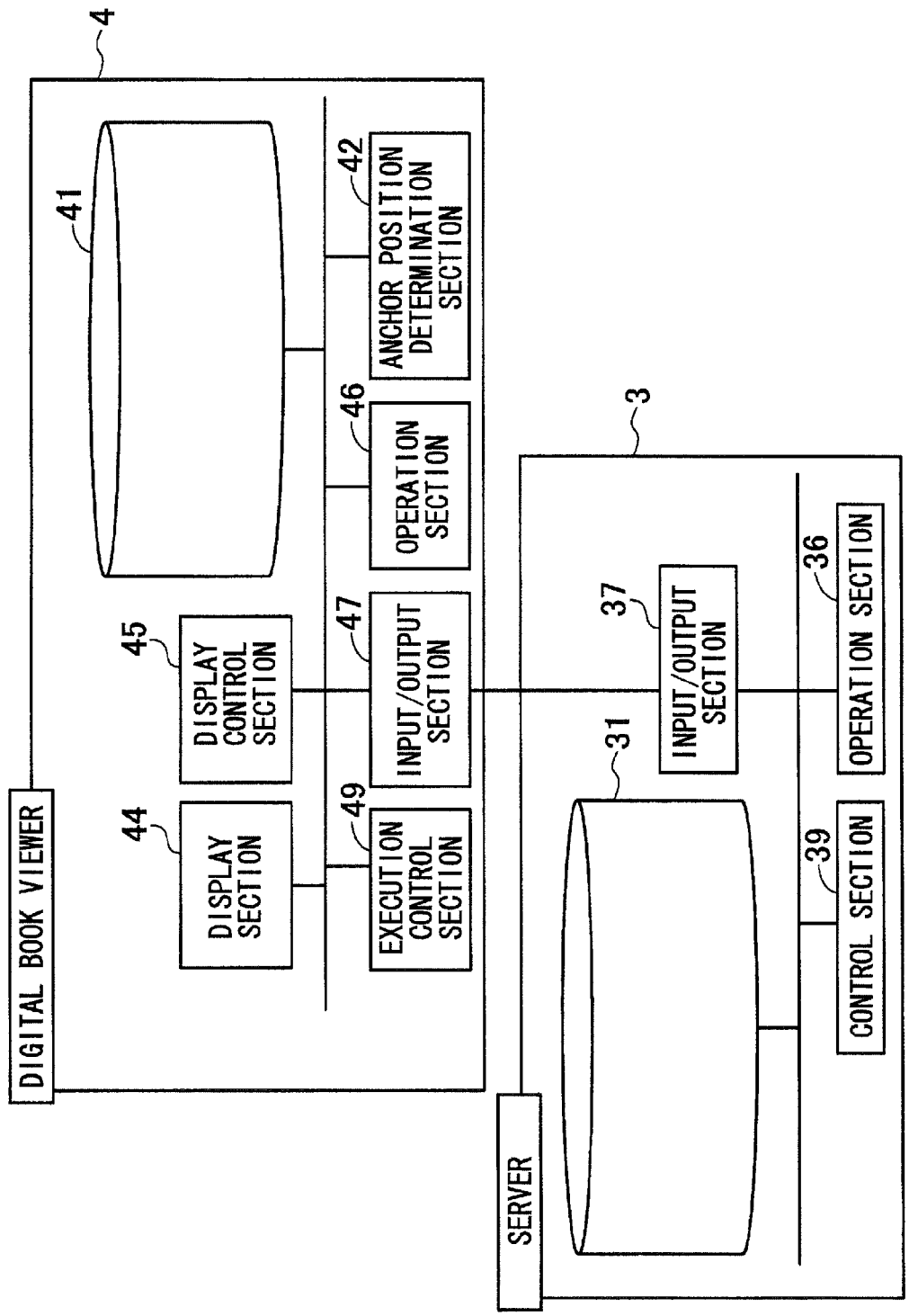
FIG. 3 is a block diagram illustrating internal configuration of the server unit and the digital viewer unit of a first embodiment.

FIG. 3 illustrates an example of internal configuration of a server unit 3 and a digital book viewer unit 4 according to a first embodiment.

The server unit 3 is a computer unit which includes an operation device capable of receiving instruction input made by a specific administrator, an input/output device capable of inputting (obtaining) and outputting various kinds of information, a control device that controls and performs various kinds of arithmetic processing, and a storage device. The digital book viewer unit 4 is a terminal unit including a display device capable of displaying images, an operation device capable of receiving instruction inputs made by the user, an input/output device capable of inputting (obtaining) and outputting various kinds of information and a control device that controls and performs various kinds of arithmetic processing. The digital book viewer unit 4 is constituted of, for example, various kinds of mobile terminal such as mobile phone, mobile tablet terminal, mobile game machine and mobile computer unit. A large number of indefinite digital book viewer units 4 may access the server unit 3.

Referring to FIG. 3, the server unit 3 includes a database (DB) 31, an operation section 36, an input/output section 37 and control section 39.

The DB 31 is constituted of a storage device such as hard disk and memory. The DB 31 stores the digital comic data. The operation section 36 is constituted of an operation device such as a keyboard, a mouse and a touch pad. The input/output section 37 is constituted of a communication device according to the embodiment. The control section 39 is constituted of a control device such as CPU (Central Processing Unit).

Referring to FIG. 3, the digital book viewer unit 4 includes a database (DB) 41, an anchor position determination section 42, a display section 44, a display control section 45, an operation section 46, an input/output section 47 and an execution control section 49.

The DB 41 stores various kinds of information such as digital comic data. The digital comic data according to the embodiment is, as described above, constituted of an image file including a page image of each page of the comic and an information file (collateral information) corresponding to each page (or all pages) of the comic. The information file according to the embodiment includes a piece of first region information (interest region information) which represents a character region within a page image in which characters who appear in the comic are drawn, a piece of second region information (at least one of the speech bubble region information and the text region information) which represents a speech region in which a speech of the character is written, and a piece of association information which associates the first region information with the second region information. Various kinds of modes are available for selecting either one or both of the text region and the speech bubble region as the speech region. The description thereof will be made later. The "character" is not limited to a person. The following description gives an example in which persons who appear on the comic are the characters. Also, the character region is not limited to a region of a face image. The following description gives an example in which a character region has a region of face image.

The anchor position determination section 42 determines a transition line (hereinafter, referred to as "anchor position line") of the position (anchor position) of the display ranges which are sequentially shifted within the page image of the digital comic data. Various kinds of modes are possible for representing the anchor position line with different kind of information. A description will be made below while taking an example in which anchor position determination section 42 determines the disposition of the anchor position as an anchor position line.

The display section 44 is a display device which is constituted of a display device capable of displaying images, and which has a predetermined screen size. The display section 44 is constituted of, for example, an LCD.

The display control section 45 (a display control device) displays images of each display range sequentially while shifting sequentially the position of the display range in the page image on the display section 44 in accordance with the anchor position line determined by the anchor position determination section 42.

The operation section 46 receives an instruction input made by the user. The operation section 46 may be a touch sensor, a key-input device or a pointing device disposed on the screen of the display section 44.

The operation section 46 according to the embodiment functions firstly as a mode switch instruction input device configured to receive switch instruction input to switch the mode between an entire region display mode in which the entire region of the page image is displayed sequentially and a key region display mode in which key regions in the page image is displayed sequentially.

Secondly, the operation section 46 according to the embodiment, functions as a shift instruction input device configured to receive an input of shift instruction (screen feed instruction) of the display ranges displayed on the display section 44.

The input/output section 47 inputs and outputs various kinds of information. The input/output section 47 according to the embodiment is constituted of a communication device that communicates with the server unit 3. The input/output section 47 transmits a digital comic data request to the server unit 3, and receives a piece of digital comic data from the server unit 3; to thereby acquire the digital comic data. The input/output section 47 is not particularly limited to the communication device such as in the embodiment, but may be an input/output device which writes on and reads from a computer readable recording medium.

Subsequently, the anchor position determination section 42 will be described below in detail.

The anchor position determination section 42 determines a transition line (anchor position line) of an anchor position (reference position of the display range) for sequentially shifting the display ranges corresponding to the screen size of the display section 44 within the page image of the digital comic data. The anchor position line is a line that indicates a reference position of a series of display ranges which are displayed sequentially on the display section 44 while being shifted.

The anchor position determination section 42 according to the embodiment calculates the reference position (anchor position) of the display range for displaying the character and a speech made by the character at once on the display section 44 based on some pieces of interest region information (first region information) which are associated with each other by the association information in the information file and at least one region information (second region information) from the speech bubble region information and the text region information. The reference position of the display ranges is included in the anchor position line.

The information file (collateral information) includes the frame region information representing frame regions in the page image. When the display size of each frame in the page image is larger than the screen size of the display section 44, the anchor position determination section 42 according to the embodiment determines the anchor position line for sequentially shifting the display range in each frame.

In the entire region display mode, the anchor position determination section 42 of the embodiment determines the anchor position line to display the entire region of page image sequentially; and in the key region display mode, the anchor position determination section 42 determines the anchor position line to sequentially display the display range including a key region based on the information file of the digital comic data.

Figure 4:
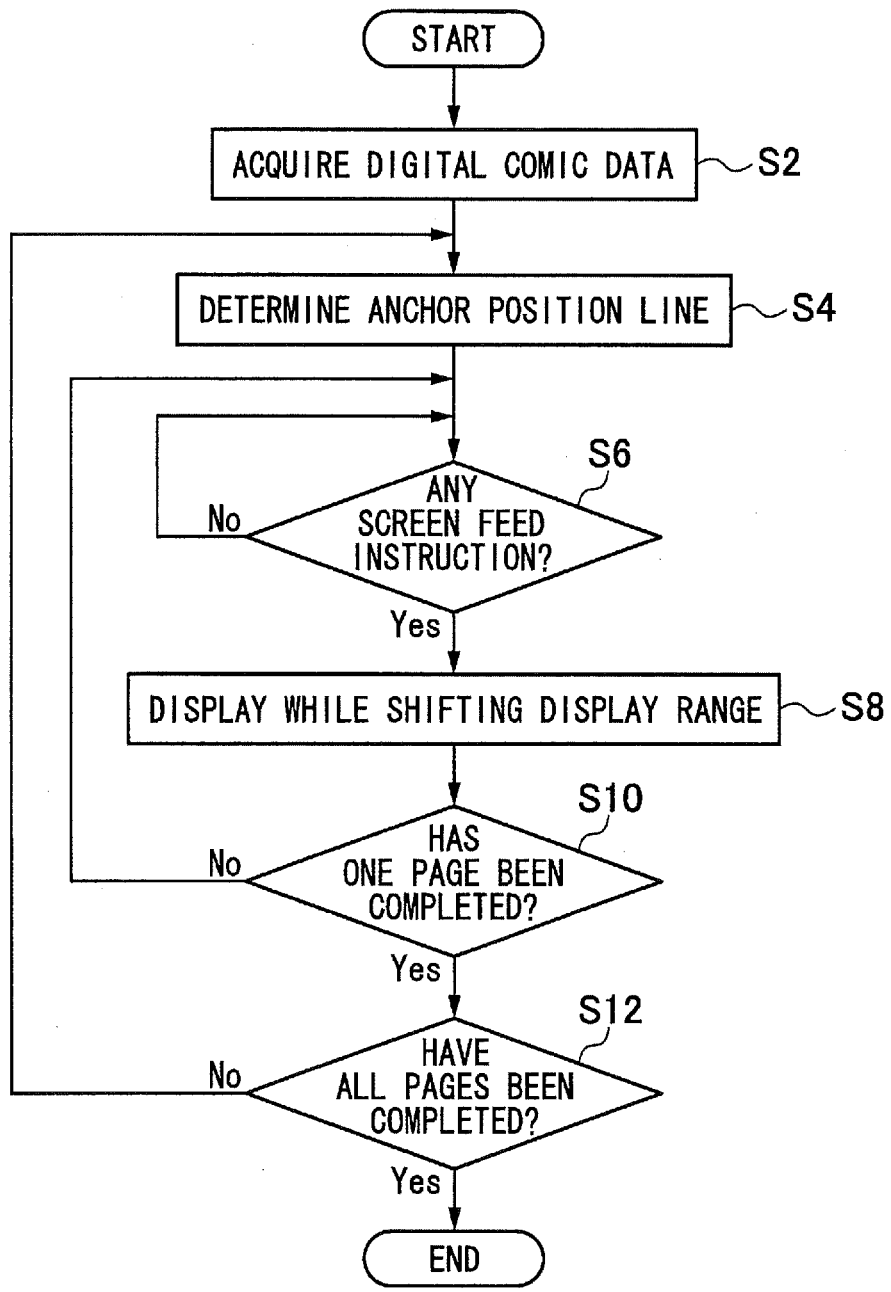
FIG. 4 is a flowchart roughly showing an example of a display control processing.

FIG. 4 is a flowchart roughly showing an example of a display control processing flow in the digital book viewer unit 4 according to the first embodiment shown in FIG. 3. The processing is executed in accordance with a program under an integrated control by execution control section 49 of the digital book viewer unit 4. The program may be provided being recorded in a predetermined non-transitory computer-readable recording medium, or may be provided via a network.

Figure 5:
FIG. 5 illustrates an example of a page image.
Figure 6:
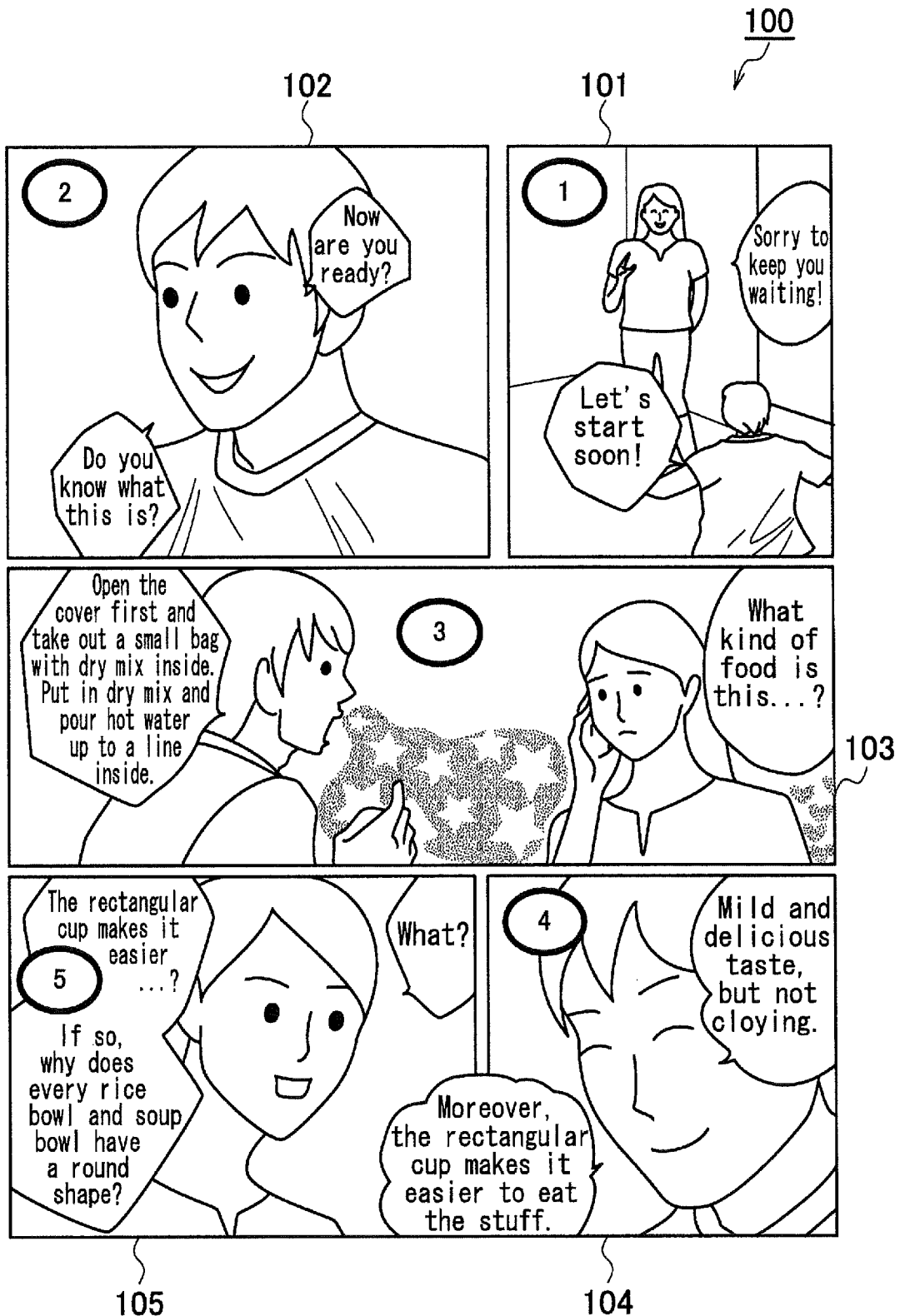
FIG. 6 illustrates a reproduction sequence of frames.

First of all the digital book viewer unit 4 acquires a piece of digital comic data from the server unit 3 through the input/output section 47 (a data acquisition device) (step S2). When the digital comic data is previously stored in the DB 41 of the digital book viewer unit 4, the following processing may be performed by using the digital comic data in the DB 41. The following description will be made assuming that a piece of digital comic data including a page image shown in FIG. 5 has been acquired. The page image shown in FIG. 5 has five frames and in the frame information of the information file of the digital comic data, a reproduction sequence of the five frames is described as shown in FIG. 6. In FIG. 6, the frame reproduction sequence of the page image 100 is: a frame with reference numeral 101, a frame with reference numeral 102, a frame with reference numeral 103, a frame with reference numeral 104, and a frame with reference numeral 105 sequentially. According to the embodiment, the information file of the digital comic data is described with a reproduction sequence of each frame. Even when the information file is not described with reproduction sequence of the frames, the reproduction sequence of the frames can be determined based on a piece of information on two-page spread written in the page information or a piece of information on the language.

Figure 7A:
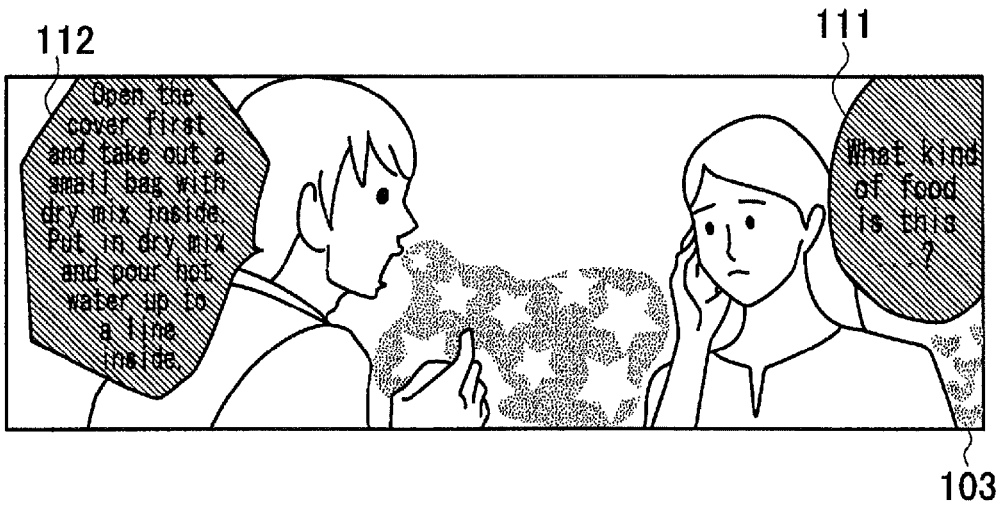
FIG. 7A illustrates speech bubble region information.
Figure 7B:
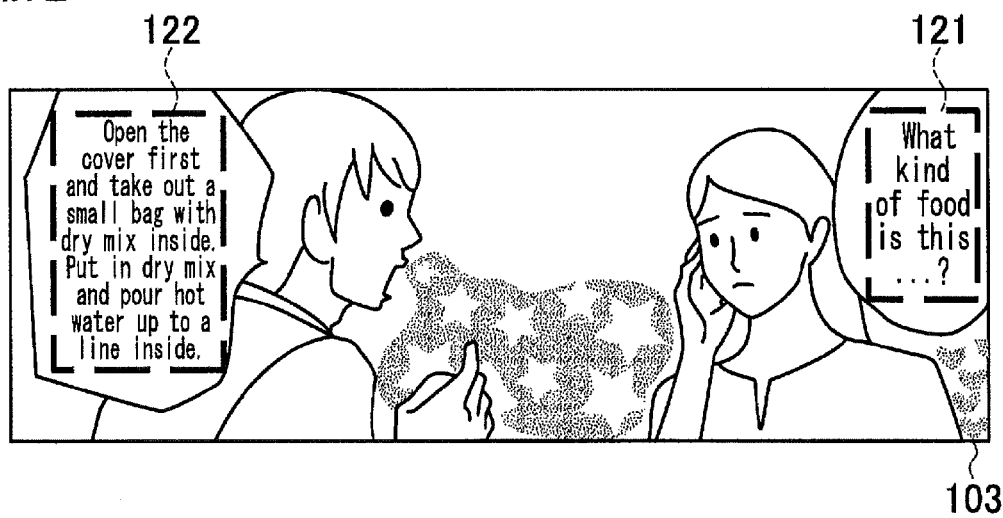
FIG. 7B illustrates text region information.
Figure 7C:
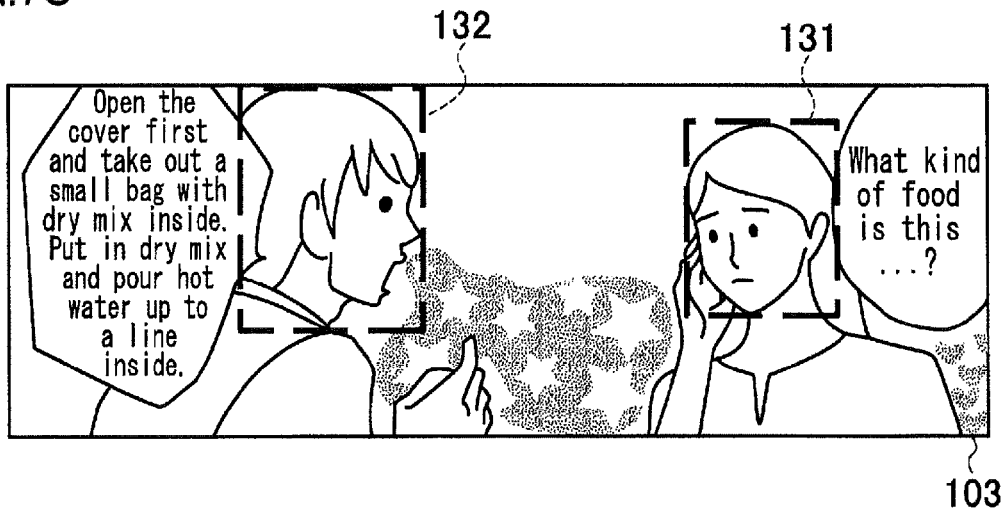
FIG. 7C illustrates interest region information (character region information)

It is assumed that the information file of the digital comic data according to the embodiment has described therein a piece of speech bubble region information, a piece of text region information, a piece of interest region information and a piece of association information. For example, in the case of the third frame 103 shown in FIG. 6, region information (speech bubble region information) of the speech bubble regions 111, 112 indicated with hatched lines as shown in FIG. 7A; region information (text region information) of the text regions 121, 122 indicated with dotted lines as shown in FIG. 7B; and region information (interest region information) of the interest regions 131, 132 indicated with dotted lines as shown in FIG. 7C are described in the information file. The interest region according to the embodiment is a region in which a face image of a character appearing in the comic (for example, comic character) is drawn.

Subsequently, the anchor position determination section 42 determines the anchor position line to sequentially shift the display ranges corresponding to the screen size of the display section 44 within the page image of the digital comic data (step S4). Various kinds of modes are available for determining the anchor position line. Description on the determination modes will be given later.

Subsequently, it is determined whether a shift instruction (referred to as "screen feed instruction") of the display ranges is input through the operation section 46 (step S6). Every time when a screen feed instruction is input through the operation section 46, the display control section 45 shifts the display ranges within the page image in accordance with the shift line of the display ranges determined in the step S4, and extracts the images for each display range from the page image to display the images within the display range on the display section 44 (step S8).

Subsequently, it is determined whether the one page has been completed (step S10). If not, the process returns to step S6. If completed, it is determined whether all pages have been complete (step S12). If not, the process returns to step S4. If completed, the processing is terminated.

Figure 8:
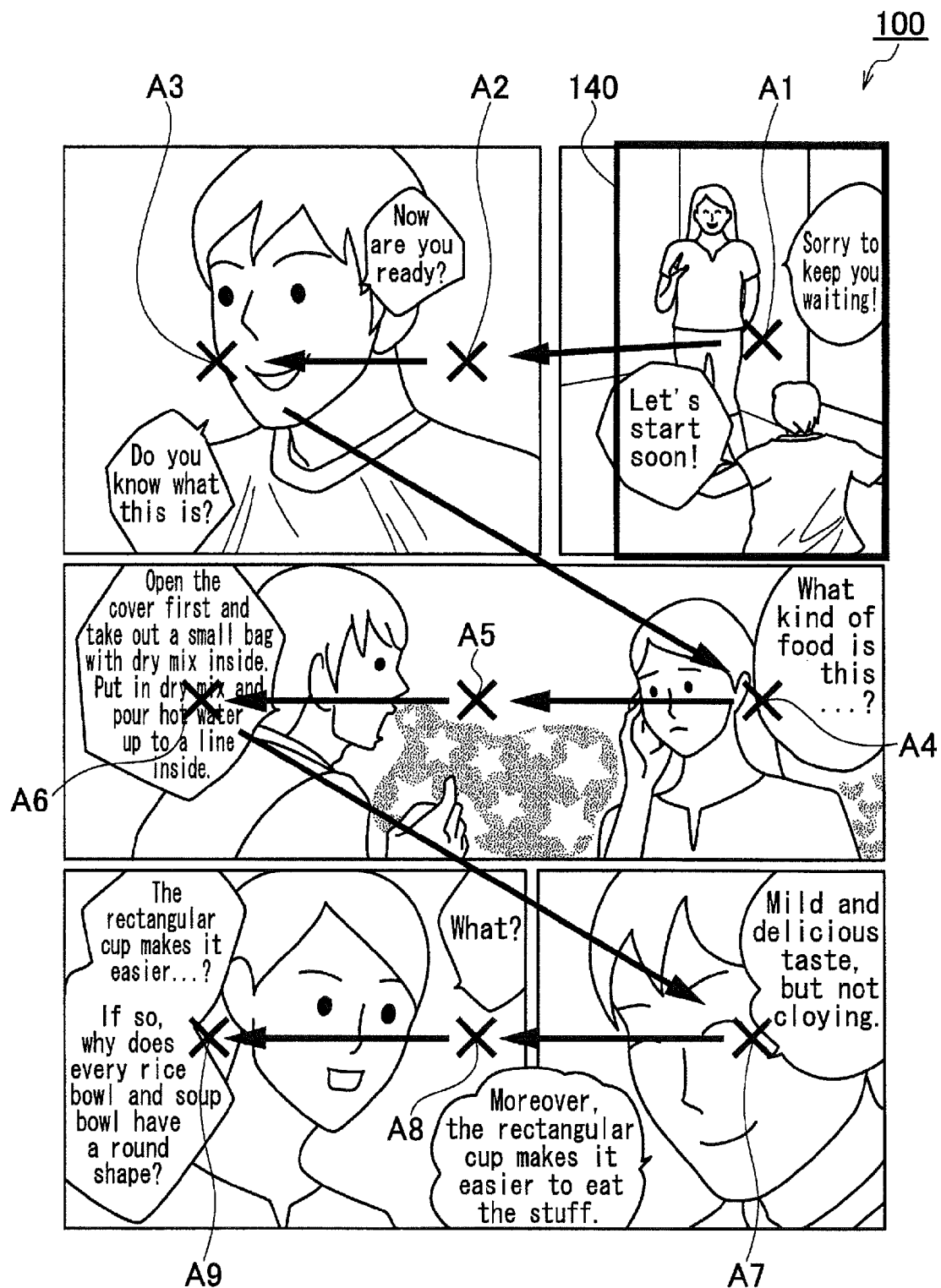
FIG. 8 illustrates line of anchor position (line of the positions of the display ranges)

Referring to FIG. 8, a description on the anchor position line is made here. The anchor position line represents a transition of the reference position (anchor position) of the display frame 140 which sequentially displays images on the display section 44 while the display frame 140 corresponding to the screen size of the display section 44 is sequentially shifted (transition) within the page image 100. According to the embodiment, the center of the display frame 140 (indicated with "X" in the figure) is predetermined as the anchor position. The transition sequence of the anchor position is represented with arrows in the figure. That is, it is configured to sequentially shift the anchor position in an order of A1, A2, A3, A4, A5, A6, A7, A8 and A9 in the figure. Such series (line) of transition of positions A1-A9 is the anchor position line. The anchor position determination section 42 according to the embodiment generates dispositions of coordinates of the anchor positions A1-A9 in the page image 100 as the anchor position line.

Various kinds of modes are available for obtaining the anchor position line. Description will be made below on a obtaining mode in which the text region information and the interest region information are used (first embodiment) and a mode in which the speech bubble region information and the interest region information are used (second example).

Figure 9:
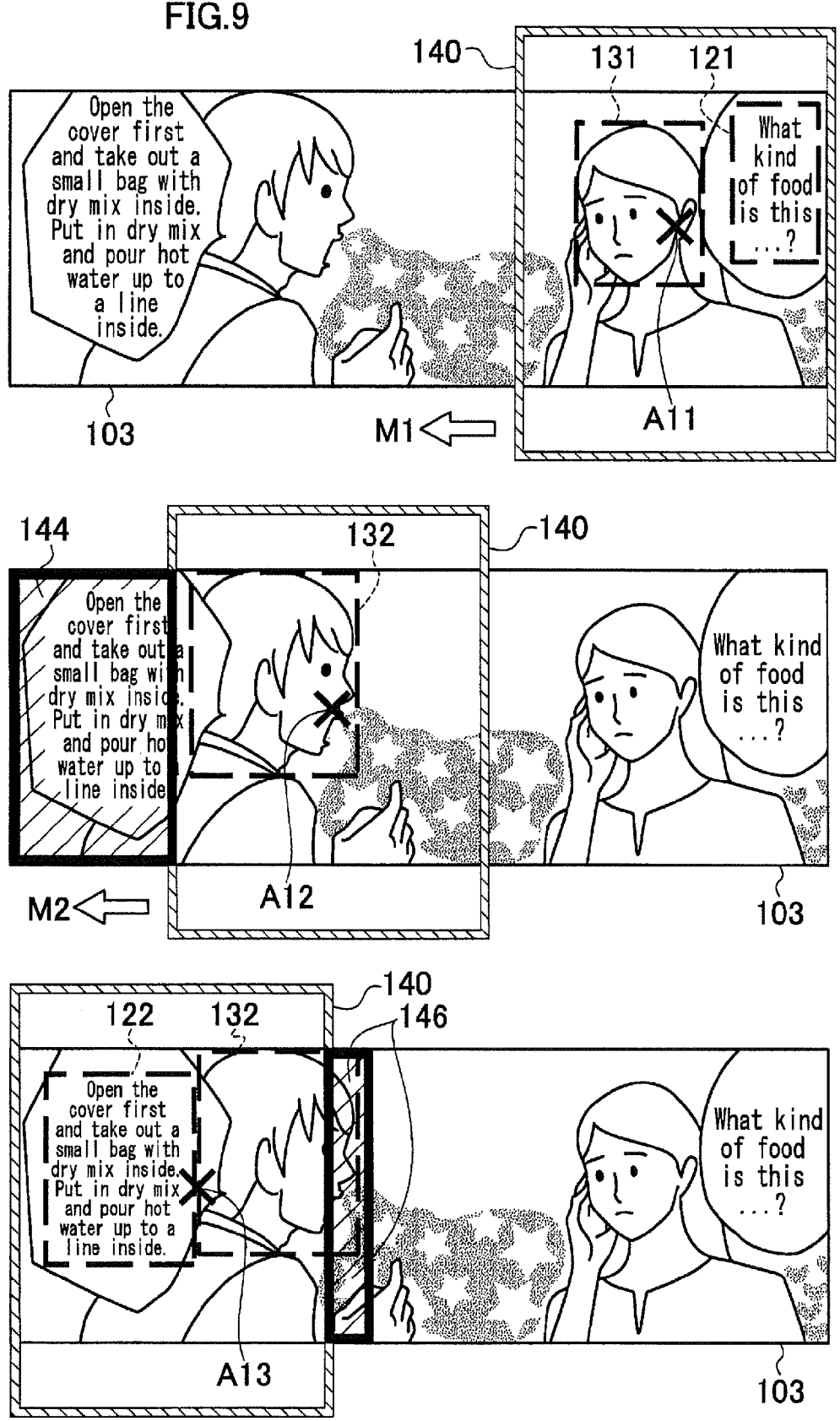
FIG. 9 illustrates of comparative example of display control.

FIG. 9 illustrates a transition of the anchor position in a comparative example for the first embodiment. Focusing to the third frame 103 in the page image 100 shown in FIG. 6, a mode of shift of the display frame 140 (represents the display range which is displayed on the display section 44 in the page image 100) is shown. First of all, referring to FIG. 9, a description is made on a problem when the present invention is not implemented.

The right side of the display frame 140 is aligned with the right side of the third frame 103 as shown at the top of FIG. 9. The anchor position determination section 42 may determine an initial reference position of the display frame 140 based on the text region information and the interest region information in the information file, or simply the initial reference position of the display frame 140 may be determined using the right side of the frame 103 as a reference. Here, the center coordinates of the display frame 140 is the anchor position A11.

Subsequently, as a first shift M1, the display frame 140 is shifted by a distance equivalent to the size of the display frame 140 (shift amount corresponding to the screen size of the display section 44). Since a face image region (interest region 132) of a character is within the range of the display frame 140, the face image region is displayed as shown in the middle of the FIG. 9. However since a speech made by the character exists in a region 144 out of the display frame 140, the user cannot observe both of the face image of the character and the speech made by the character at once.

Assuming that, as the second shift M2, the display frame 140 is shifted until the left side of the display frame 140 reaches the left side of the third frame 103, then as shown at the bottom in FIG. 9, since the text region 122 of the speech made by the character is within the range of the display frame 140, the speech is displayed but, since a part of the face image region (interest region 132) of the character is out of the range of the display frame 140, the user cannot satisfactory observe the face image of the character and the speech thereof.

That is, in the series of A11, A12 and A13 shown in FIG. 9, the user cannot observe the face image of the character and the speech made by the character at the left side in the figure at once on any screen.

Figure 10:
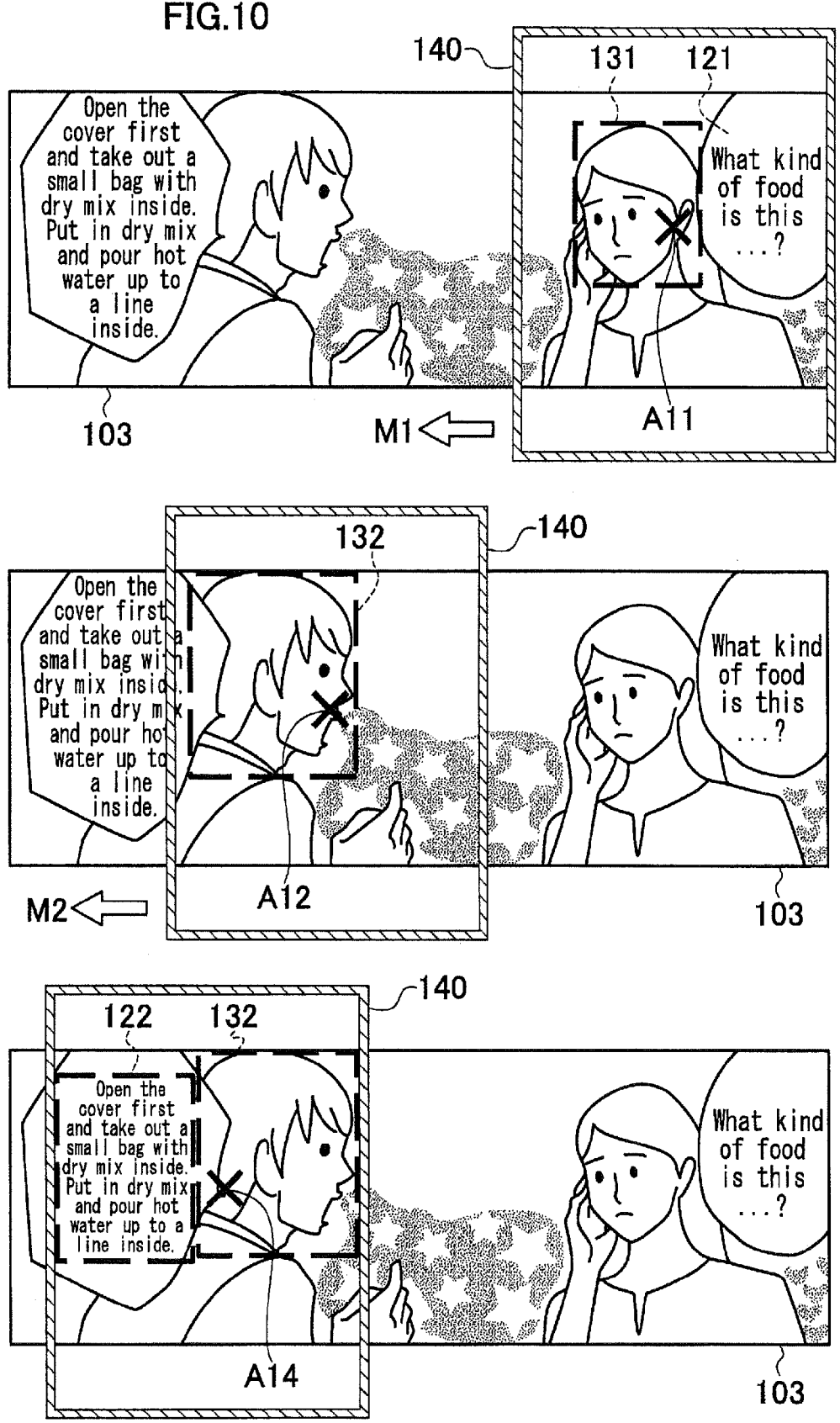
FIG. 10 illustrates a display example in the first embodiment of the display control.

FIG. 10 illustrates preferred transition of the anchor position in the display control of the first embodiment to which the present invention is applied.

The anchor position determination section 42 detects, based on the association information, that a text region 121 of a speech made by a first character (character at the right side in the figure) and a face image region (interest region 131) are associated with each other, and the text region 122 of the second character (character at the left side in the figure) and the face image region (interest region 132) are associated with each other. Then, the anchor position determination section 42 adds the anchor position A11 at which the text region 121 of the speech made by the first character and the face image region (interest region 131) are displayed at once on the display section 44 and the anchor position A14 at which the text region 122 of the speech of the second character and the face image region (interest region 132) are displayed at once on the display section 44 to the anchor position line. According to the embodiment, the anchor position determination section 42 generates a disposition including the coordinates of A11 and the coordinates of A14 as a piece of information representing the anchor position line (anchor position line information).

In FIG. 10, the anchor position A12 is also added to the anchor position line. At the anchor position A12, the face image of the second character (character at the left side in the figure) is displayed but the speech is not displayed. However, when the screen-feed reproduction is made in accordance with the anchor position line A11, A12 and A14, both of the face image of the second character and the image of the speech are displayed at once at the anchor position A14. Therefore, the user obtains the sensation same as observing the original of the comic. For example, in the case of anchor position line (A11, A12 and A14) shown in FIG. 10, the user recognizes the distance between two characters.

Figure 11:
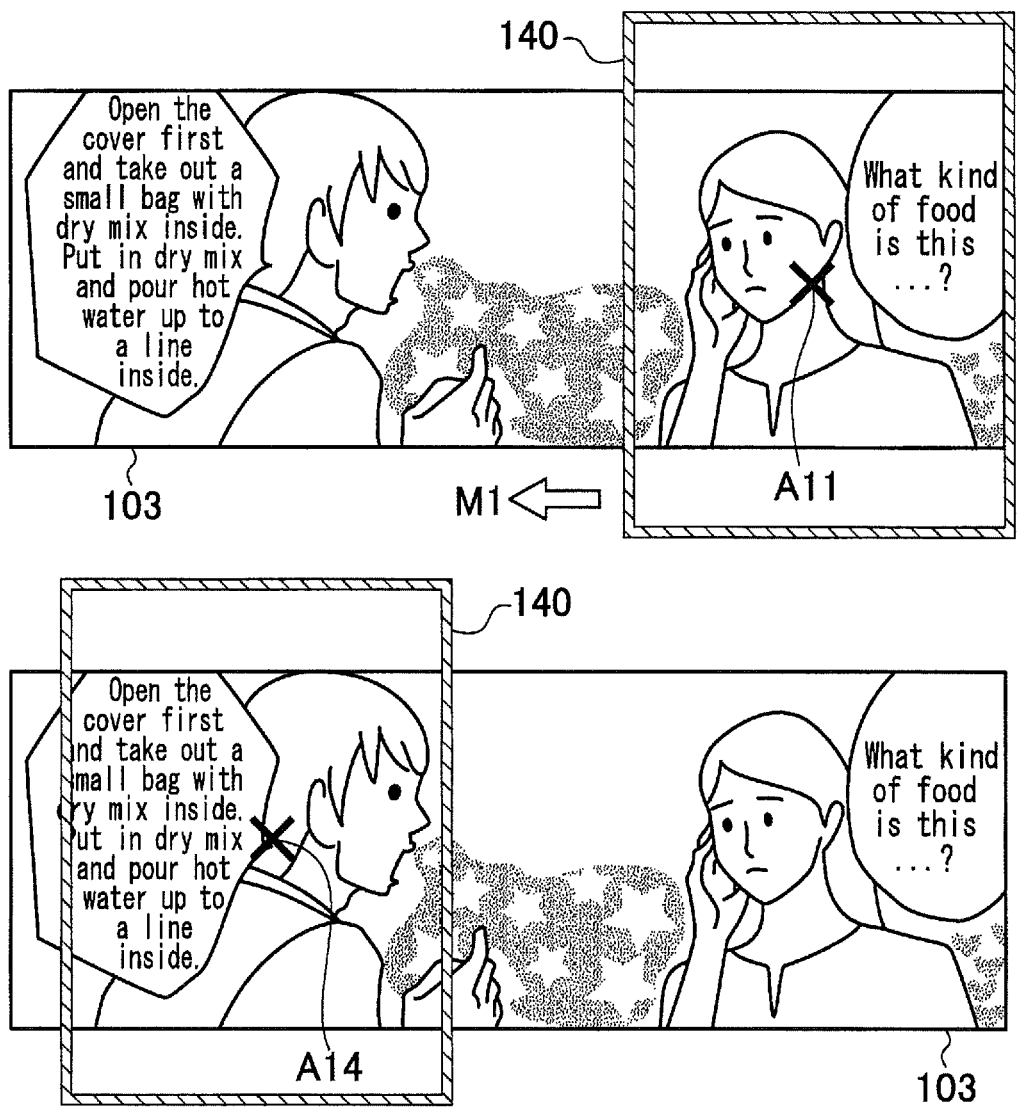
FIG. 11 illustrates another display example in the first embodiment of the display control.

However, it is conceivable that some users prefer a series in which the anchor position A14 comes next to the anchor position A11 (A11 and A14) while omitting the anchor position A12 so that the story can be viewed more swiftly. Then, the anchor position A12 may be omitted from the anchor position line as shown in FIG. 11. The present invention includes both of the cases of anchor position line shown in FIG. 10 and the case of anchor position line shown in FIG. 11.

In the above description, only the third frame 103 is used. On the other frames (101, 102, 104 and 105 in FIG. 6) also, the anchor position line is determined by performing the determination in the same manner.

Figure 12:
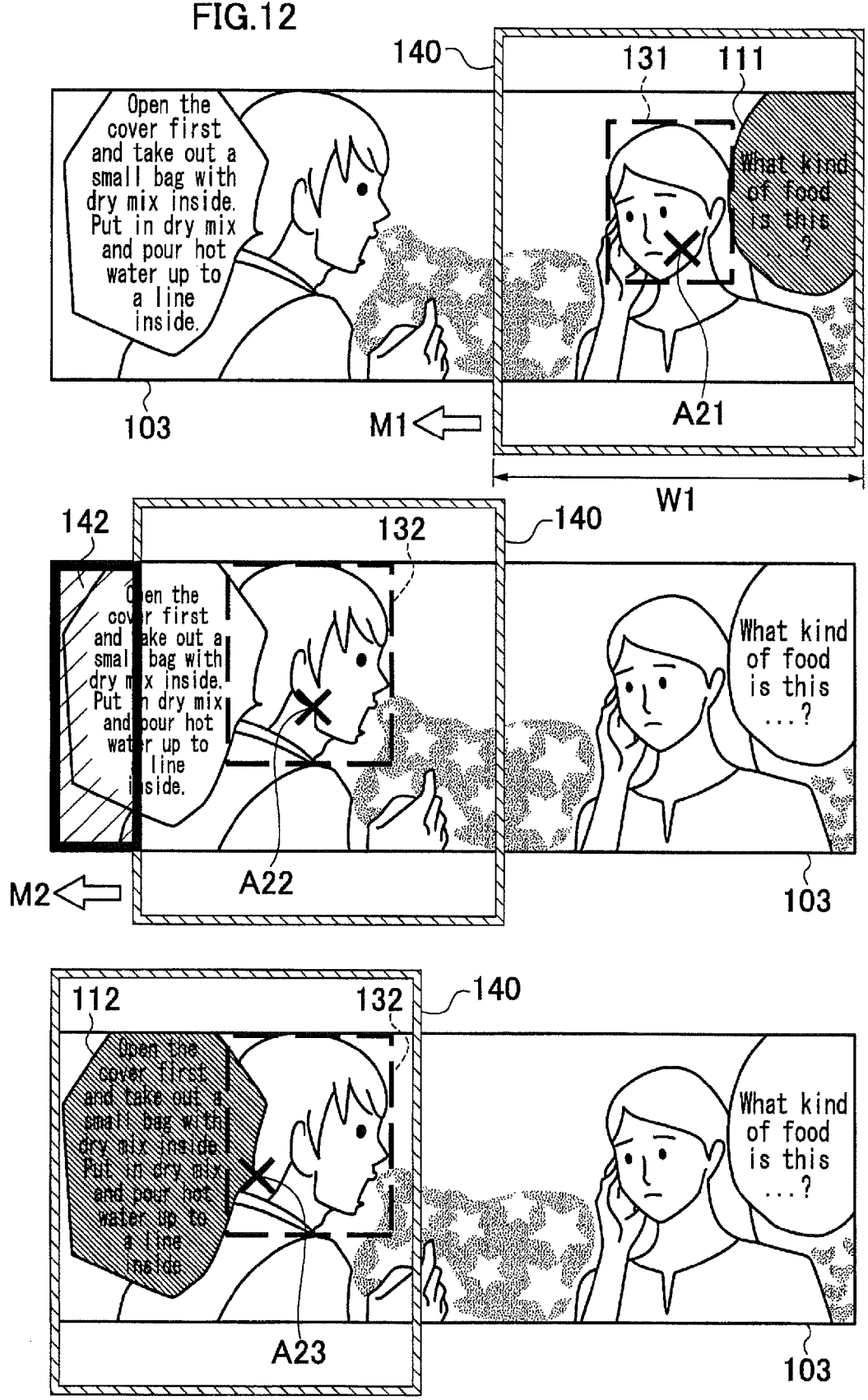
FIG. 12 illustrates a display example in a second embodiment of the display control.

FIG. 12 illustrates a preferred transition of the anchor position in the second embodiment of the display control to which the present invention is applied.

The anchor position determination section 42 detects that, based on the association information, a speech bubble region 111 containing a speech made by a first character (character at the right side in the figure) and a face image region (interest region 131) are associated with each other, and a speech bubble region 112 containing a speech made by a second character (character at the left side in the figure) and the face image region (interest region 132) are associated with each other. The anchor position determination section 42 adds, to the anchor position line, an anchor position A21 at which the speech bubble region 111 relevant to the first character and the face image region (interest region 131) are displayed at once on the display section 44 and the anchor position A23 at which speech bubble region 112 relevant to the second character and the face image region (interest region 132) are displayed at once on the display section 44. According to the embodiment, the anchor position determination section 42 generates a disposition including coordinates of A21 and coordinates of A23 as a piece of information (anchor position line information) representing the anchor position line.

According to the embodiment, first of all, the right side of the display frame 140 is aligned with the right side of the third frame 103 as shown at the top in FIG. 12. The anchor position determination section 42 may determine the initial position of the display frame 140 based on the speech bubble region information and the interest region information in the information file; or the anchor position determination section 42 may simply determine display position of the display frame 140 based on the right side of the frame 103. Here, the center coordinates of the display frame 140 is the anchor position A21.

Then, as the first shift M1, the display frame 140 is shifted by a distance equivalent to the size of the display frame 140 (a shift amount corresponding to the screen size of the display section 44). When the center coordinates of the display frame 140 (reference position of the display range) is the anchor position A22 as shown in the middle of FIG. 12, since the face image region (interest region 132) of the second character is within the range of the display frame 140, the face image region is displayed. Since a part of the speech made by the character is located at the outer region 142 of the display frame 140, the user cannot observe the face image of the character and the speech with satisfaction at once.

However, as the second shift M2, when the display frame 140 is shifted until the left side of the display frame 140 reaches the left side of the third frame 103, since both of the face image region (interest region 132) of the second character and the speech bubble region 112 containing the speech made by the second character are located within the range of the display frame 140 as shown at the bottom in FIG. 12, both of the face image region (interest region 132) of the second character and the speech bubble region 112 are displayed. Thus, the user can observe the face image of the second character and the speech at once.

In FIG. 12, the anchor position A22 is added to the anchor position line. However, A22 may be omitted from the anchor position line as shown in FIG. 13. The present invention includes both of the case of the anchor position line in FIG. 12 and the case of the anchor position line in FIG. 13.

In the above description, only the third frame 103 is used. On the other frames (101, 102, 104 and 105 in FIG. 6) also, the anchor position line is determined by performing the determination in the same manner.

Second Embodiment

Figure 14:
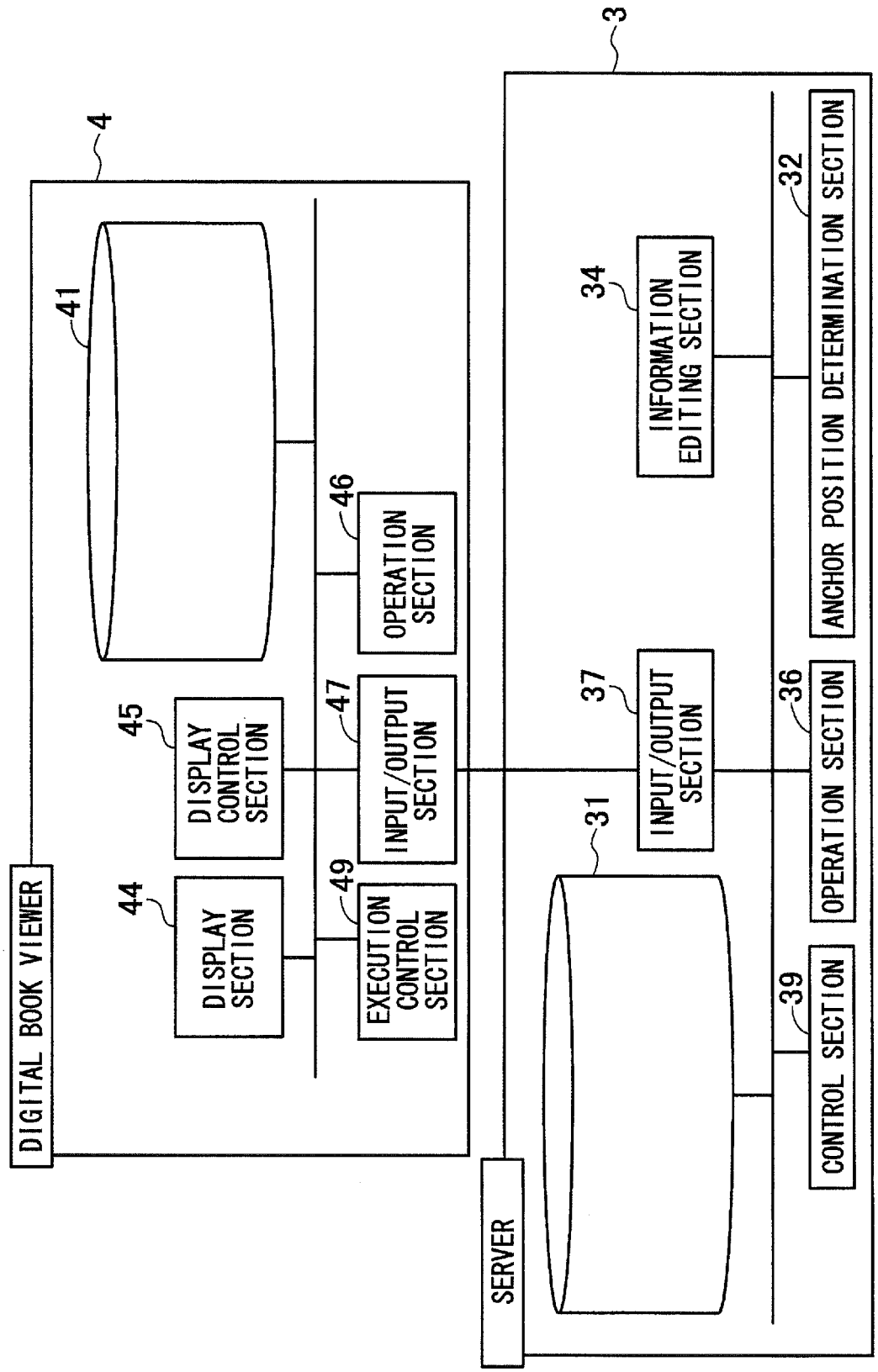
FIG. 14 is a block diagram showing an example of internal configuration of a server unit and a digital book viewer unit according to a second embodiment.

FIG. 14 illustrates an example of internal configuration of the server unit 3 and the digital book viewer unit 4 according to the second embodiment. Elements identical to those in the first embodiment shown in FIG. 3 are given with the same numerals and description thereof is omitted. According to the second embodiment, the server unit 3 determines the anchor position line of the display ranges and generates a piece of anchor position line information. The digital book viewer unit 4 performs screen feed control (shift of display ranges) based on the anchor position line information received from the server unit 3.

Referring to FIG. 14, the server unit 3 includes an anchor position determination section 32 and an information editing section 34. Other elements (DB 31, operation section 36, input/output section 37 and control section 39) are the identical to those in the first embodiment.

The anchor position determination section 32 of the server unit 3 in the second embodiment is an element corresponding to the anchor position determination section 42 of the digital book viewer unit 4 in the first embodiment. That is, the shift sequence determination section 32 determines the anchor position line to sequentially shift the display ranges corresponding to the screen size (screen size of the display section 44) of the digital book viewer unit 4 within the page image of the digital comic data. In particular, when determining the transition line of the position of the display ranges corresponding to the screen size of the digital book viewer unit 4 on which the display ranges are sequentially shifted within the page image, the anchor position determination section 32 includes the position of the display ranges on which the character and the speech made by the character are displayed at once on the display section 44 in the anchor position line based on the first region information (interest region information) associated with each other by the association information and the second region information (at least one of the text region information and the speech bubble region information).

The mode to determine the anchor position line in the anchor position determination section 32 of the server unit 3 is the identical to the mode to determine the anchor position line in the anchor position determination section 42 of the digital book viewer unit 4 of the first embodiment, therefore the description thereof is omitted here.

The information editing section 34 writes a piece of anchor position line information representing the anchor position line determined by the anchor position determination section 42 into the information file of the digital comic data (collateral information). The digital comic data including the information file added with the anchor position line information by the information editing section 34 is transmitted to the digital book viewer unit 4 by the input/output section 37.

The information editing section 34 of the embodiment writes a piece of anchor position line information for the entire region display mode to sequentially display the entire regions of the page image and the anchor position line information for the key region display mode to sequentially display the key region in the page image into the information file of the digital comic data (collateral information).

For example, with respect to the text region and the interest region as the key region information, the information editing section 34 writes a piece of information representing an anchor position line (A11, A12 and A14) shown in FIG. 10 as the anchor position line information for the entire region display mode and a piece of information representing the anchor position line (A11 and A14) shown in FIG. 11 as the anchor position line information for the key region display mode.

Also, for example, with respect to the speech bubble region and the interest region as the key region information, the information editing section 34 writes the anchor position line (A21, A22 and A23) shown in FIG. 12 as the anchor position line information for the entire region display mode and the anchor position line (A21 and A23) shown in FIG. 13 as the anchor position line information for the key region display mode.

The DB 41, the display section 44, the display control section 45, the operation section 46, the input/output section 47 and the execution control section 49 in the digital book viewer unit 4 have been described in the first embodiment. Therefore, the description thereof is made on different points only.

The input/output section 47 of the digital book viewer unit 4 receives the digital comic data added with the anchor position line information from the server unit 3.

The display control section 45 of the digital book viewer unit 4 sequentially extracts the images for each display range from the page image in accordance with the anchor position line information in the received information file of the digital comic data and sequentially displays the images on the display section 44; thereby the images of each display frame 140 are sequentially displayed on the display section 44 while sequentially shifting the anchor position in the page image on the display section 44.

The operation section 46 of the digital book viewer unit 4 receives a switch instruction input to switch between the entire region display mode and the key region display mode. In the case of entire region display mode, the display control section 45 of the embodiment sequentially displays the entire region of the page image on the display section 44 in accordance with the anchor position line information for the entire region display mode in the information file. In the case of the key region display mode, the display ranges including the key region are sequentially displayed on the display section 44 in accordance with the anchor position line information for the key region display mode in the information file.

In the above embodiment, the description was made on a case where the character was a person. The present invention is not limited to such a case. The character may be a creature other than person or may be a virtual object such as a robot, a telephone, or a mountain.

The region information representing a speech region is not limited to the speech bubble region information or text region information illustrated above, but any format may be employed.

The present invention is not limited to the examples described in this specification and the examples illustrated in the drawings. Needless to say, various kinds of design changes or modifications may be possible within a range within the sprit of the present invention.

What is claimed is:

1. A viewer unit, comprising:
    a data acquisition device configured to acquire a page image of each page of a comic and a piece of digital comic data which includes a piece of first region information representing a character region in which a character who appears in the comic is drawn within the page image, a piece of second region information representing a speech region in which a speech made by the character is written, and a piece of association information which associates the first region information with the second region information;
    a display device having a predetermined screen size;
    a determination device configured to determines a positional line of a display range which corresponds to the screen size of the display device and is shifted sequentially within the page image, the determination device configured to determine to include a position of the display range in the positional line in order to display the character and the speech made by the character at once on the display device based on the first region information and the second region information which are associated with each other by the association information; and
    a display control device configured to control to shift the position of the display range sequentially within the page image in accordance with the positional line determined by the determination device in order to display the images of each display range sequentially on the display device.

2. The viewer unit according to claim 1, wherein the second region information representing the speech region comprises a piece of speech bubble region information representing a speech bubble region in which a speech bubble is drawn within the page image, the speech bubble region information being associated with the first region information representing the character region by the association information, and
    the determination device determines whether both of the character region and the speech bubble region in which a speech made by the character is written are positioned within the display range to thereby determine the position of the display range included in the positional line.

3. The viewer unit according to claim 1, wherein the second region information representing the speech region comprises a piece of text region information representing a text region in which any one of texts within the page image is located, the text region information being associated with the first region information representing the character region by the association information, and
    the determination device determines whether both of the character region and the text region in which a speech of the character is written are located within the display range to thereby determine the position of the display range included in the positional line.

4. The viewer unit according to claim 2, wherein the second region information representing the speech region comprises a piece of text region information representing a text region in which any one of texts within the page image is located, the text region information being associated with the first region information representing the character region by the association information, and
    the determination device determines whether both of the character region and the text region in which a speech of the character is written are located within the display range to thereby determine the position of the display range included in the positional line.

5. The viewer unit according to claim 1, further comprising a shift instruction input device configured to receive an input of a shift instruction of the display range displayed on the display device,
    wherein the display control device controls to shift the display range displayed on the display device within the page image every time when the shift instruction is input into the shift instruction input device.

6. The viewer unit according to claim 2, further comprising a shift instruction input device configured to receive an input of a shift instruction of the display range displayed on the display device,
    wherein the display control device controls to shift the display range displayed on the display device within the page image every time when the shift instruction is input into the shift instruction input device.

7. The viewer unit according to claim 3, further comprising a shift instruction input device configured to receive an input of a shift instruction of the display range displayed on the display device,
    wherein the display control device controls to shift the display range displayed on the display device within the page image every time when the shift instruction is input into the shift instruction input device.

8. The viewer unit according to claim 4, further comprising a shift instruction input device configured to receive an input of a shift instruction of the display range displayed on the display device,
    wherein the display control device controls to shift the display range displayed on the display device within the page image every time when the shift instruction is input into the shift instruction input device.

9. The viewer unit according to claim 1, wherein the character region comprises a region in which a face image of a character in the comic is drawn.

10. The viewer unit according to claim 2, wherein the character region comprises a region in which a face image of a character in the comic is drawn.

11. The viewer unit according to claim 3, wherein the character region comprises a region in which a face image of a character in the comic is drawn.

12. The viewer unit according to claim 4, wherein the character region comprises a region in which a face image of a character in the comic is drawn.

13. The viewer unit according to claim 5, wherein the character region comprises a region in which a face image of a character in the comic is drawn.

14. The viewer unit according to claim 6, wherein the character region comprises a region in which a face image of a character in the comic is drawn.

15. A server unit for transmitting a page image of each page of a comic and a piece of digital comic data to a viewer unit having a predetermined screen size, the digital comic data including a piece of first region information representing a character region within the page image in which a character who appears in the comic is drawn, a piece of second region information representing a speech region in which a speech of the character is written, and a piece of association information for associating the first region information with the second region information,
    the server unit, comprising:

a data acquisition device configured to acquire the digital comic data;

a determination device configured to determine a positional line of a display range which corresponds to a screen size of the viewer unit and is shifted sequentially within the page image, the determination device configured to determine to include a position of the display range for displaying the character and the speech made by the character at once on the viewer unit in the positional line based on the first region information and the second region information which are associated with each other by the association information; and a device configured to write a piece of information representing the positional line determined by the determination device in the digital comic data.

16. A viewer unit, comprising:

a reception device configured to receive digital comic data from the server unit set forth in claim 15;

a display device having a predetermined screen size; and a display control device configured to control to display the images of each display range sequentially on the display device while shifting the position of the display range sequentially within the page image in accordance with a piece of information representing the positional line within the digital comic data received by the reception device.

17. A display control method for displaying a digital comic on a display device having a predetermined screen size, the display control method comprising:

acquiring a page image of each page of a comic and a piece of digital comic data which includes a piece of first region information representing a character region in which a character who appears in the comic is drawn within the page image, a piece of second region information representing a speech region in which a speech of the character is written, and a piece of association information which associates the first region information with the second region information;

determining a positional line of a display range which corresponds to the screen size of the display device and is shifted sequentially within the page image, and determining to include a position of the display range in the positional line in order to display the character and the speech made by the character at once on the display device based on the first region information and the second region information which are associated with each other by the association information; and controlling to shift the position of the display range sequentially within the page image in accordance with the positional line determined by the determining in order to display the images of each display range sequentially on the display device.

18. A digital comic editing method for editing a page image of each page of a comic and a piece of digital comic data which includes a piece of first region information representing a character region in which a character who appears in the comic is drawn within the page image, a piece of second region information representing a speech region in which a speech of the character is written, and a piece of association information which associates the first region information with the second region information, the digital comic editing method comprising:

acquiring the digital comic data;

determining a positional line of a display range which corresponds to the screen size of the display device and is shifted sequentially within the page image, and determining to include a position of the display range in the positional line in order to display the character and the speech made by the character at once on the display device based on the first region information and the second region information which are associated with each other by the association information; and writing a piece of information representing the positional line determined by the determining in the digital comic data.

19. A non-transitory computer-readable medium storing a program for causing a computer unit to execute the display control method set forth in claim 17.

20. A non-transitory computer-readable medium storing a program for causing a computer unit to execute the digital comic editing method set forth in claim 18.

* * * * *